(12) United States Patent
Gao et al.

(10) Patent No.: US 10,029,834 B2
(45) Date of Patent: Jul. 24, 2018

(54) CABLE TIE EMPLOYING COMPOSITE OF NYLON AND CARBON NANOTUBES

(71) Applicant: Thomas & Betts International, LLC, Wilmington, DE (US)

(72) Inventors: Yan Gao, Memphis, TN (US); Alan D. Neal, Germantown, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 30 days.

(21) Appl. No.: 14/474,378

(22) Filed: Sep. 2, 2014

(65) Prior Publication Data

US 2015/0101152 A1    Apr. 16, 2015

Related U.S. Application Data

(60) Provisional application No. 61/890,916, filed on Oct. 15, 2013.

(51) Int. Cl.
| | | |
|---|---|---|
| *B65D 63/10* | (2006.01) | |
| *B29C 47/00* | (2006.01) | |
| *B29B 9/06* | (2006.01) | |
| *B29K 77/00* | (2006.01) | |
| *B29K 105/16* | (2006.01) | |
| *B29K 507/04* | (2006.01) | |
| *B29L 31/00* | (2006.01) | |
| *B29B 9/12* | (2006.01) | |

(52) U.S. Cl.
CPC ...... *B65D 63/1027* (2013.01); *B29C 47/0011* (2013.01); *B65D 63/1036* (2013.01); *B65D 63/1063* (2013.01); *B29B 9/06* (2013.01); *B29B 2009/125* (2013.01); *B29C 47/0004* (2013.01); *B29K 2077/00* (2013.01); *B29K 2105/162* (2013.01); *B29K 2507/04* (2013.01); *B29L 2031/727* (2013.01); *Y10T 24/1498* (2015.01)

(58) Field of Classification Search
CPC .. B65D 63/1072; B65D 63/1063; F16L 3/233
See application file for complete search history.

(56) References Cited

U.S. PATENT DOCUMENTS

| | | | | |
|---|---|---|---|---|
| 5,429,875 A | * | 7/1995 | Okamoto | ........... B22F 7/04 24/306 |
| 6,493,910 B1 | | 12/2002 | Dischler | |
| 6,528,572 B1 | * | 3/2003 | Patel | ........... C08K 3/04 524/439 |
| 6,682,677 B2 | | 1/2004 | Lobovsky et al. | |
| 6,734,262 B2 | * | 5/2004 | Patel | ........... C08L 79/08 106/472 |
| 6,924,335 B2 | | 8/2005 | Fan et al. | |
| 6,942,921 B2 | | 9/2005 | Rueckes et al. | |
| 7,151,129 B2 | | 12/2006 | Ishikawa et al. | |
| 7,181,811 B1 | | 2/2007 | Tomanek et al. | |
| 7,214,430 B2 | | 5/2007 | Handa et al. | |
| 7,247,290 B2 | | 7/2007 | Lobovsky et al. | |
| 7,481,952 B2 | | 1/2009 | Ren et al. | |
| 7,501,069 B2 | | 3/2009 | Liu et al. | |

(Continued)

FOREIGN PATENT DOCUMENTS

CN    1974666 A    6/2007

*Primary Examiner* — Robert John Sandy
*Assistant Examiner* — Rowland Do
(74) *Attorney, Agent, or Firm* — Hoffmann & Baron, LLP

(57) ABSTRACT

Cable ties employing a composite of nylon and carbon nanotubes.

20 Claims, 1 Drawing Sheet

(56) References Cited

U.S. PATENT DOCUMENTS

| | | | |
|---|---|---|---|
| 7,601,421 B2 | 10/2009 | Khabashesku et al. | |
| 7,651,769 B2 | 1/2010 | Dubrow | |
| 7,704,480 B2 | 4/2010 | Jiang et al. | |
| 7,854,992 B2 | 12/2010 | Fu et al. | |
| 7,897,248 B2 | 3/2011 | Barrera et al. | |
| 7,938,996 B2 | 5/2011 | Baughman et al. | |
| 8,230,555 B2 * | 7/2012 | Browne | B65D 63/12 24/16 PB |
| 8,844,111 B1 * | 9/2014 | Yunk, Jr. | B29C 35/02 264/236 |
| 2003/0224132 A1 * | 12/2003 | Han | B82Y 30/00 428/36.9 |
| 2004/0109823 A1 * | 6/2004 | Kaplan | A61K 41/0038 424/1.11 |
| 2007/0107986 A1 * | 5/2007 | Cael | A01M 31/025 182/187 |
| 2007/0292622 A1 * | 12/2007 | Rowley | B82Y 10/00 427/407.1 |
| 2008/0280137 A1 | 11/2008 | Ajayan et al. | |
| 2010/0301278 A1 * | 12/2010 | Hirai | B82Y 30/00 252/502 |
| 2011/0091711 A1 * | 4/2011 | Neivandt | B29C 39/003 428/304.4 |
| 2011/0104430 A1 | 5/2011 | Mehrabi et al. | |
| 2011/0171454 A1 * | 7/2011 | Hitoe | B82Y 30/00 428/292.1 |
| 2012/0041441 A1 * | 2/2012 | Bernstein | A61B 17/823 606/74 |
| 2013/0008083 A1 * | 1/2013 | Weder | A01G 5/04 47/45 |
| 2013/0081232 A1 * | 4/2013 | Magno, Jr. | B65D 63/1063 24/16 PB |
| 2013/0180184 A1 * | 7/2013 | Cheh | E04B 1/32 52/80.1 |

* cited by examiner

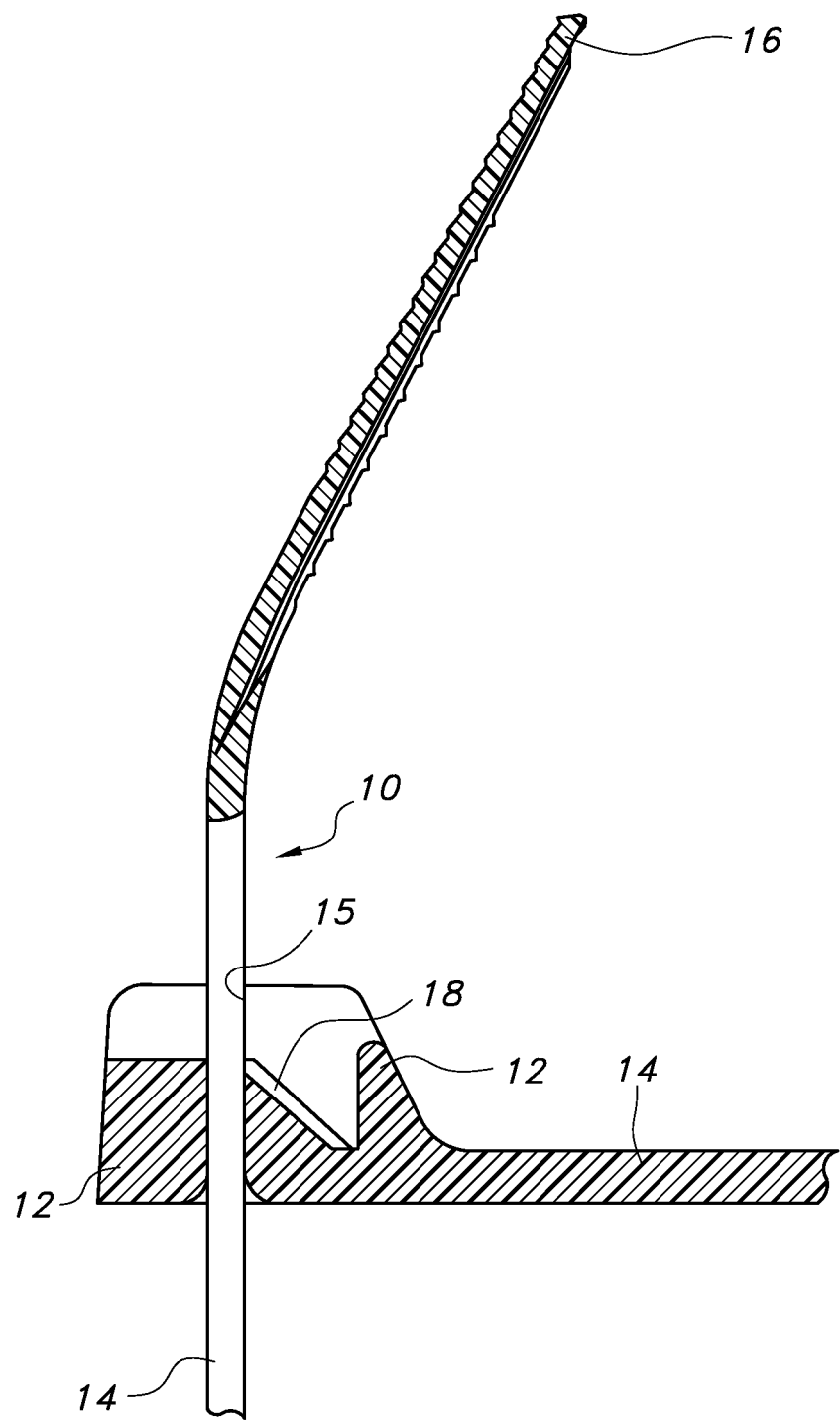

CABLE TIE EMPLOYING COMPOSITE OF NYLON AND CARBON NANOTUBES

CROSS-REFERENCE TO RELATED APPLICATION

This application claims the benefit of U.S. Provisional Application No. 61/890,916, filed Oct. 15, 2013, the contents of which are incorporated by reference herein.

FIELD OF THE INVENTION

The present invention relates to cable ties having improved mechanical strength. More particularly, the present invention is directed to cable ties employing a composite of nylon and carbon nanotubes.

BACKGROUND OF THE INVENTION

Cable ties are well known and may be used to bundle or secure a group of articles such as electrical wires or cables. Typically, cable ties include a head, and elongate tail and a longitudinal strap therebetween. The head of the cable tie includes a locking element which is engageable with the strap to secure the strap in the head.

There are generally two types of cable ties. The first is a one-piece cable tie. The one-piece tie is integrally formed of plastic material, preferably nylon, and uses a molded pawl inside the head and a formed teeth array in the strap body to secure the strap in the tail. The second is a two-piece cable tie. The two-piece tie has a nylon head and strap body. A stainless steel barb is embedded in the head which digs into the strap to secure the strap in the body.

Performance of a cable tie is measured by insertion force, i.e., how much force is required to insert the strap into the head. Cable tie performance is also measured by its tension force. Generally, cables ties are categorized by their holding tension force (e.g., 18 lbs, 50 lbs and 120 lbs). The maximum break limit of a cable tie is about 150% of its maximum rated holding tension force.

Generally, cable ties are formed from nylon 6,6 matrix alone. While suitable for the intended purposes, cable ties made of nylon 6,6 matrix only provide limited mechanical strength due to the material limits of the nylon 6,6 material. Thus, there is a need for cable ties which have improved holding tension force.

SUMMARY OF THE INVENTION

The present invention provides cable ties including a composite of a polymer and carbon nanotubes as well as methods of making such cable ties. Advantageously, such cable ties have an increased tensile strength as compared to a cable tie formed with nylon 6,6 matrix alone. As such, the improved cable ties are more readily able to hold a bundle and achieve higher performance in the applications for which they are employed. Desirably, such cable ties may allow use of 10-15 wt % more regrind nylon 6,6 material as compared to the current maximum of 25 wt % used in a cable tie formed of nylon 6,6 matrix. Additionally, such cable ties may provide the same or improved flame class rating (UL94) as compared to a cable tie formed of nylon 6,6 matrix.

BRIEF DESCRIPTION OF THE FIGURE

FIG. 1 shows, in section, an exemplary cable tie of the present invention, having a cable tie head and extending strap, with the strap inserted into the head.

DETAILED DESCRIPTION OF THE INVENTION

Referring to FIG. 1, a cable tie 10 of the present invention is shown. Cable tie 10 is typically an elongate molded plastic member which is used in a manner well known in the art to wrap around a bundle of articles such as electrical wire or cable (not shown). Cable tie 10, including a composite of nylon and carbon nanotubes, is suitable for both indoor and outdoor use. Cable tie 10 has a head 12 at one end thereof, a tail 16 at the other end of the head 12 and a generally planar strap 14 therebetween. In the illustrative embodiment provided, head 12 is formed as an integral portion of cable tie 10. However, in certain applications cable tie 10 may be constructed in a manner where head 12 is formed separately from strap 14.

Head 12 of cable tie 10 includes an aperture 15 therethrough (shown with strap 14 therein) for insertably accommodating the tail 16 and passage of the strap 14 therein in a first direction "A". Head 12 of cable tie 10 includes a locking device 18 supported by the head 12 and extending into the aperture. The locking device permits movement of the strap 14 in the first direction "A" and prevents substantial movement of the strap 14 in a second direction "B" opposite the first direction upon an attempt to withdraw the strap 14 from the aperture. The locking device may include a metallic barb such as shown in U.S. Pat. No. 5,513,421; or an integrally formed plastic pawl such as shown in U.S. Pat. No. 7,017,237.

The present invention provides cable ties including a composite of a polymer and carbon nanotubes. In one embodiment, the polymer is nylon. In one embodiment, the polymer is nylon 6,6. In one embodiment, the polymer is nylon 6. In one embodiment, the polymer is nylon 6,6/6. In one embodiment, the carbon nanotubes are chemically functionalized. In one embodiment, the carbon nanotubes are chemically functionalized and the polymer is nylon 6,6. In one embodiment, carbon nanotubes are present in the composite in an amount between 0.05 wt % and 20 wt %. In one embodiment, carbon nanotubes are present in the composite in an amount between 0.05 wt % and 10 wt %. In one embodiment, carbon nanotubes are present in the cable tie in an amount between 0.05 wt % and 0.5 wt %. In one embodiment, carbon nanotubes are present in the cable tie in an amount of at least 0.1 wt %.

In one embodiment, the cable tie further includes nylon 6,6 resin (in addition to a composite of a polymer and carbon nanotubes wherein the polymer may also be nylon 6,6). In one embodiment, nylon 6,6 is a commercial nylon 6,6 grade. In one embodiment, at least a portion of nylon 6,6 is regrind nylon 6,6.

In one embodiment, the cable tie further includes carbon fibers. In one embodiment, the carbon fibers are present in an amount between 1 wt % and 10 wt %. In one embodiment where the cable tie further includes carbon fibers, the carbon nanotubes are present in the cable tie in an amount between 0.05 wt % to 2 wt %. In certain embodiments, the presence of carbon fibers in the cable tie allows a reduction in the amount of carbon nanotubes required to achieve a desired material tensile strength.

In one embodiment, carbon nanotubes are present in the cable tie in an amount no greater than about 5 wt %. More specifically, carbon nanotubes are present in the cable tie in an amount between 0.05 wt % and about 5 wt %. In one embodiment, carbon nanotubes are present in the cable tie in an amount no greater than 0.5 wt %. Although, increasing amounts of carbon nanotubes in a cable tie yield increased material tensile strength, depending on the compositing uniformity, an excessive amount of carbon nanotubes in a cable tie can result in a dielectric dissipative cable tie which is undesirable for certain applications.

In one embodiment, the cable tie exhibits an increase in tensile strength of 20% or greater compared with a cable tie consisting of nylon 6,6 matrix. In one embodiment, the cable tie exhibits an increase in tensile strength of greater than 20% compared with a cable tie consisting of nylon 6,6 matrix. In one embodiment, the cable tie exhibits an increase in tensile strength of 30% or greater compared with a cable tie consisting of nylon 6,6 matrix.

In general, methods of preparing cable ties are provided which include (a) compounding technology that synthesizes a composite of nylon and carbon nanotubes, and (b) molding process technology that creates cable tie products employing the composite of nylon and carbon nanotubes compounded in (a).

More specifically, the present invention provides methods of preparing a cable tie including dispersing carbon nanotubes into a polymer matrix via a process selected from solution composition, melt composition, and in-situ composition technique to form a chemical bond or a van der Waals interaction with the polymer (e.g., nylon 6 or nylon 6,6 molecular chain) such that a composite is formed, wherein the composite includes carbon nanotubes in an amount between 0.05 wt % and 20 wt %; extruding or molding the composite to form particles; melting particles of the composite, optionally with nylon 6,6 resin, to form a molten material; and molding the cable tie from the molten material. In one embodiment, the composite includes carbon nanotubes in an amount between 0.05 wt % and 10 wt %. In one embodiment, the cable tie includes carbon nanotubes in an amount between 0.05 wt % and 0.5 wt %. In one embodiment, the cable tie includes carbon nanotubes in an amount of at least 0.1 wt %. In one embodiment, the cable tie includes carbon nanotubes in an amount no greater than 0.5 wt %. In certain embodiments, particles of composite are mixed with nylon 6,6 resin prior to melting.

In one embodiment, the method further includes dispersing carbon fibers into the polymer matrix. In one embodiment, carbon fibers are present in an amount between 1 wt % and 10 wt %. In one embodiment where carbon fibers are included, carbon nanotubes are present in the cable tie in an amount between 0.05 wt % to 2 wt %. In one embodiment where carbon fibers are included, carbon nanotubes are present in the cable tie in an amount no greater than 0.5 wt %.

In one embodiment, carbon nanotubes are uniformly dispersed into a polymer matrix. In one embodiment, the carbon nanotubes are chemically functionalized prior to dispersing them into a polymer matrix. In one embodiment, the carbon nanotubes are physically separated, e.g., by surfactant such as polyvinylpyrrolidone, prior to dispersing them into a polymer matrix. In certain embodiments, the particles of composite are pellets, beads, disks, irregular geometries, or a combination of two or more thereof. In certain embodiments, the particles of composite are about 0.1 inch in size. In one embodiment, the cable ties are formed via injection-molding using standard injection machines as are well known to a skilled artisan.

In one embodiment where a composite of nylon 6/carbon nanotubes is formed, a surfactant (e.g., polyvinylpyrrolidone) is first used to disperse carbon nanotubes in an aqueous solution prior to mechanical mixing with an aqueous dispersion of nylon 6 powder. The resultant mixture is then condensed from the liquid phase before it is melt extruded into composite pellets. See, e.g., O'Connell et al., Chem. Phys. Lett., 342:265 (2001).

In another embodiment where a composite of nylon 6,6/carbon nanotubes is formed, acidified carbon nanotubes are mechanically mixed with nylon 6,6 powder to produce composite pellets. Such compositing method is well known to a skilled artisan.

In one embodiment, carbon nanotubes are first composited with nylon 6 after which the resultant composite is compounded with nylon 6,6 to produce a material for molding a cable tie.

Carbon nanotubes are manufactured using methods well known to a skilled artisan. Both single-walled carbon nanotubes and multi-walled carbon nanotubes are suitable. In one embodiment, the carbon nanotubes are multi-walled carbon nanotubes. For example, raw multi-walled carbon nanotubes with a diameter between 30 to 60 nm and a length between 1 to 5 µm. In one embodiment, the carbon nanotubes are produced by chemical vapor deposition. Likewise, processes to chemically functionalize nanotubes (i.e., to form functionalized carbon nanotubes) or physically separate carbon nanotubes (i.e., surfactant separated carbon nanotubes) are well known to a skilled artisan. Additionally, a composite of a polymer and carbon nanotubes is formed using processes well known to a skilled artisan, such as solution composition, melt composition, or in-situ composition technique. For example, a fiber formed from a composite of nylon and carbon nanotubes is described in Gao et al., "*Continuous Spinning of a Single-Walled Carbon Nanotube-Nylon Composite Fiber,*" *Am. Chem. Soc.*, 127 (11):3847-3854 (2005). Similarly, extrusion and molding techniques to form particles are well known to a skilled artisan as are molding techniques, such as injection molding, to form cable ties.

Though not meant to be limited by any theory with the subject invention, it is believed that carbon nanotubes in a composite of polymer and carbon nanotubes act as a reinforcing filler which improves the performance of cable ties formed therewith. While cable ties made of nylon 6,6 alone exhibit sufficient mechanical strength for their intended purpose, cable ties including a composite of carbon nanotubes and nylon 6,6 exhibit enhanced tensile strength compared to cable ties formed of nylon 6,6 alone.

It will be appreciated by those skilled in the art that changes could be made to the embodiments described above without departing from the broad inventive concept thereof. It is understood, therefore, that this invention is not limited to the particular embodiments disclosed, but is intended to cover modifications that are within the spirit and scope of the invention, as defined by the appended claims.

What is claimed is:

1. A cable tie capable of bundling or securing a group of articles, the cable tie comprising:
    a tail at one end of the cable tie;
    a head at the other end of the cable tie, the head having a locking device and configured to insertably accommodate the tail; and
    a planar strap therebetween;
    wherein the cable tie consists of a composite of a polymer and carbon nanotubes.

2. The cable tie of claim 1, wherein the polymer is nylon.

3. The cable tie of claim 1, wherein the polymer is nylon 6,6.

4. The cable tie of claim 1, wherein the polymer is nylon 6.

5. The cable tie of claim 1, wherein the carbon nanotubes are chemically functionalized.

6. The cable tie of claim 1, wherein the carbon nanotubes are present in the composite in an amount between 0.05 wt % and 20 wt %.

7. The cable tie of claim 1, wherein the carbon nanotubes are present in the cable tie in an amount between 0.05 wt % and 0.5 wt %.

8. The cable tie of claim 1, wherein the cable tie exhibits an increase in tensile strength of 20% or greater compared with a cable tie consisting of nylon 6,6 matrix.

9. A method of preparing the cable tie according to claim 1, the method comprising the steps of:
   dispersing the carbon nanotubes into a polymer matrix via a process selected from a solution composition, melt composition, and in-situ composition technique such that the composite is formed, wherein the composite comprises the carbon nanotubes in an amount from 0.05 wt % and 20 wt %;
   extruding or molding the composite to form particles;
   melting particles of the composite, optionally with nylon 6,6 resin, to form a molten material; and
   molding the cable tie from the molten material.

10. The method of claim 9, wherein the cable tie comprises the carbon nanotubes in an amount between 0.05 wt % and 0.5 wt %.

11. The method of claim 9, further comprising dispersing carbon fibers in the polymer matrix.

12. The method of claim 11, wherein the carbon fibers are present in the polymer matrix in an amount between 1 wt % and 10 wt %.

13. The method of claim 9, wherein the particles are melted with nylon 6,6 resin.

14. The method of claim 9, wherein the polymer is nylon.

15. The method of claim 9, wherein the polymer is nylon 6.

16. The method of claim 9, wherein the polymer is nylon 6,6.

17. The method of claim 9, further comprising processing carbon nanotubes to form chemically functionalized carbon nanotubes prior to dispersing.

18. A method of preparing the cable tie according to claim 1, the method comprising the steps of:
   dispersing the carbon nanotubes into a polymer matrix via a process selected from a solution composition, melt composition, and in-situ composition technique such that the composite is formed, wherein the composite comprises the carbon nanotubes in an amount from 0.05 wt % and 20 wt %;
   extruding or molding the composite to form particles;
   melting particles of the composite to form a molten material; and
   molding the cable tie from the molten material.

19. A cable tie capable of bundling or securing a group of articles, the cable tie comprising:
   a tail at one end of the cable tie;
   a head at the other end of the cable tie, the head having a locking device and configured to insertably accommodate the tail; and
   a planar strap therebetween;
   wherein the cable tie consists of a composite of a polymer, carbon nanotubes, and carbon fibers.

20. The cable tie of claim 19, wherein the carbon fibers are present in an amount of between 1 wt % and 10 wt %.

* * * * *